Jan. 11, 1949. G. F. GAYER 2,458,988
LABYRINTH PACKING
Filed April 2, 1945
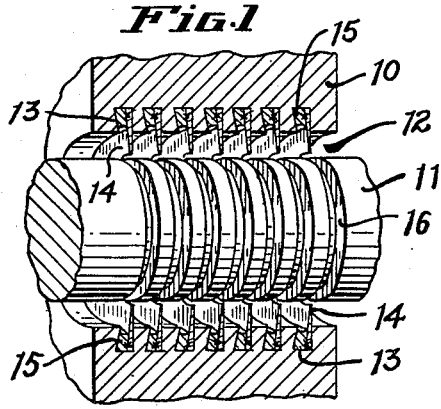
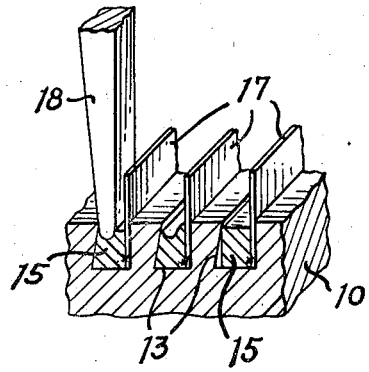
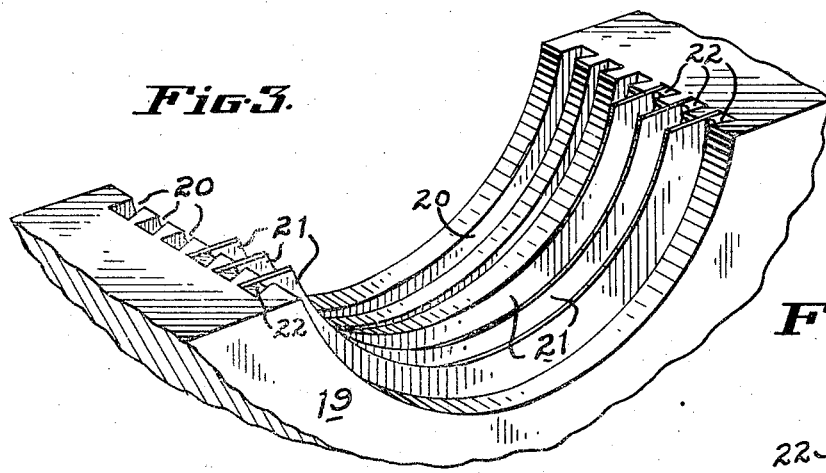
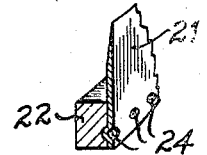
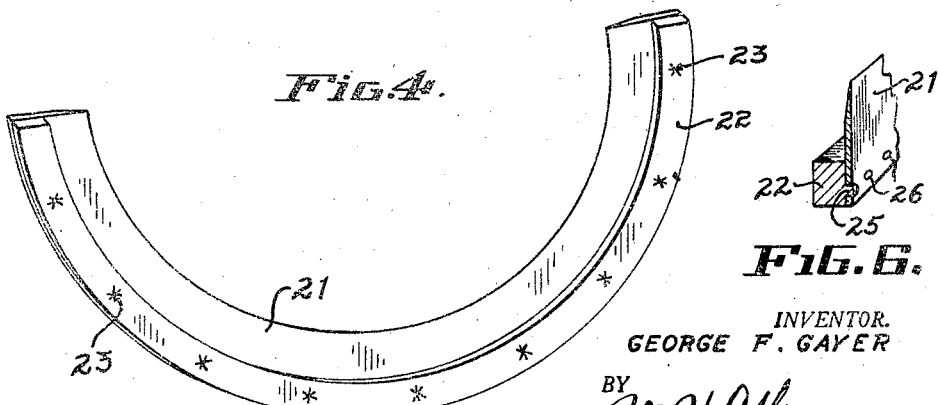
INVENTOR.
GEORGE F. GAYER
BY
*Wm. H. Atkinson*
ATTORNEY Patented Jan. 11, 1949

2,458,988

UNITED STATES PATENT OFFICE 2,458,988

LABYRINTH PACKING

George F. Gayer, Palo Alto, Calif., assignor, by mesne assignments, to Westinghouse Electric Corporation, East Pittsburgh, Pa.

Application April 2, 1945, Serial No. 586,109

1 Claim. (Cl. 286—10)

My present invention relates to an improved labyrinth type of seal or packing means for the clearance space between two relatively rotating parts or members, such as are found in fluid pressure turbines and the like, and more particularly it relates to labyrinth seal forming member having an improved means for securing the parts thereof in an operative position upon a supporting member.

An object of the invention is to provide a labyrinth type sealing means for the clearance space between two relatively rotating members in which a novel and improved means is provided for securing a seal forming strip of metal in a groove formed in its supporting member.

Another object of the invention is to provide an improved labyrinth type sealing strip for the clearance between two relatively rotating members which can be assembled and handled as a unitary element.

Another object of the invention is to provide a new and novel labyrinth type of seal forming means for the clearance space between two relatively rotating members in which the sealing means is composed of two parts welded together and of such proportions that the sealing means, and its securing means, may be handled and positioned in a retaining groove as an integral unit, after which one of said parts may be deformed to secure the unit so formed firmly to a supporting member.

Other objects and advantages of the invention will be in part evident to those skilled in the art, and in part pointed out hereinafter in the following description taken in connection with the accompanying drawing, wherein there is shown by way of illustration and not of limitation a preferred embodiment of my invention.

In the drawing:

Figure 1 is a fragmentary, perspective view showing a form which the sealing means of my invention may take, Figure 2 is a fragmentary, perspective view showing a preferred form of the invention and the manner in which the parts are secured together, Figure 3 is a fragmentary view of a portion of a turbine adapted to surround a balancing or dummy piston upon the end of a steam turbine rotor unit and provided with a sealing means constructed in accordance with my invention, Figure 4 is a perspective view showing a seal forming unit constructed in accordance with the preferred embodiment of my invention, and Figures 5 and 6 are fragmentary views showing other methods that I may use to secure the parts together.

The problem of providing packings or seals of the so-called labyrinth type in the clearance space about rotating shafts and/or between relatively rotating members, such as are found in impulse and reaction type turbines, and about balancing or dummy pistons often used in such units, has been given considerable attention by engineers in the past and many forms of sealing means have been proposed. In some instances the sealing means comprises a series of labyrinth forming strips of tapering cross-section to provide knife edges that may be subject to some wear in the event of inadvertent contact with a relatively moving part. However, in some instances these sealing strips have been made of uniform thickness, and in accordance with my present invention I, for the purpose of simplifying the construction and avoiding the expense incidental to a total tapering of these strips, prefer to use a strip of metal of uniform thickness and taper only the outer edge thereof. The art abounds with various different arrangements by which the labyrinth seal forming strips of the seal or packing are secured upon their supporting member. In some cases the sealing strips or fins are bent along their secured edge by a curling thereof, or by the formation of a right-angled flange thereupon which is adapted to engage or interlock with a deformable metal securing member. In these instances when the deformable member is deformed, as by caulking, it is generally caused to also engage with an undercut groove in the far side of a recess into which the sealing strip is firmly secured to its support. In all of these earlier arrangements the seal forming member is formed as a separate piece, apart from the caulking strip used to secure it into a retaining groove. This, therefore, means that in positioning these members in such a recess or groove of a supporting member, and the final securing of the same in the recess with the caulking strip, there is involved some difficulty, due to the fact that two individual parts must be handled, positioned and held properly with respect to each other during the caulking operation. To overcome this difficulty and also eliminate the necessity for any special upsetting at the secured edge of the sealing strips, I propose, by my invention, to form the sealing strip and the caulking strip as an integral unit by welding or brazing the caulking strip directly to one side of the seal forming strip or member prior to its assembly upon a supporting member. In the formation of my improved sealing strip I prefer to use a non-corrosive metal, such as brass or bronze or one of the stainless steel alloys, and for the deformable caulking strip I may use a soft steel or other malleable metal, and while I have shown the caulking strip as secured to the sealing strip by the spot welding method, it will be understood that these members may be secured together by other means and other forms of welding.

For a better understanding of the invention reference is now had to the accompanying drawing where, in Figure 1, the numeral 10 designates a stationary member through which a rotating member or shaft 11 is extended with a substantial clearance space 12 therebetween. The member 10 has a series of dovetail grooves or recesses 13 arranged in spaced relation along the clearance space 12, and in each of these dovetail grooves 13 there is disposed against one side thereof a fin or seal forming member 14 that is of tapering cross-section so as to provide a knife edge. Each of the grooves 13 is also here shown as having a metal ring 15 engaging the other side thereof which is deformed by caulking so as to completely occupy the dovetail grooves 13 and thus secure the seal forming members or fins 14 firmly in place. In this illustration the shaft 11 is also shown as having annular grooves or recesses 16 formed therein and positioned opposite the fins or seal forming members 14. But, it should be explained that these grooves 16 are not an essential requirement. However, they may be found advantageous under certain conditions of operation, and in other instances it will be found that a more effective seal may result if the seal forming members or fins 14 are extended into these grooves or recesses 16 so as to thereby form a more tortuous path for the flow of any high pressure steam or like fluid axially through the space 12.

In Figure 2 of the drawing I have shown a number of sealing strips, designated by the numeral 17, which, unlike the seal forming strips or fins 14, are of uniform thickness, and in this view one of the deformable metal members or caulking strips 15 is shown in its undeformed condition and as welded to one side of an associated seal forming strip or fin 17. The thickness of the deformable caulking strip 15 is such as to permit its easy insertion, with the seal forming member or fin 17 firmly attached, into the recess or dovetail grooves 13. At this point it will be noted that the dovetail grooves 13 are here shown as undercut along only one side. This will leave a substantially transverse or vertically extending wall at the other side of each of the recesses or grooves 13 against which the fins or seal forming members 17 may be positioned and held transverse to the axis of the rotating member. With the dovetail grooves 13 formed in this manner, all deformation of the caulking strips 15 will occur in one direction and the result will be a firm securing of the fins or seal forming members 17 upon the member 10. It will be appreciated that the deformation of these caulking strips 15 may be effected in any convenient manner. In this figure of the drawing I have illustrated this operation as being carried out with a simple caulking tool 18 which has a strip deforming end of a shape and size that will produce the proper deformation without breaking the bond between the caulking strips 15 and the seal forming strips or fins 17.

In the use of labyrinth packings of the character here disclosed, it is the general custom, as shown in Figure 3 of the drawing, to mount the seal forming strips or fins upon the stationary one of the two relatively rotating members between which a packing or sealing is desired, and to render this possible, the sealing strip supporting member, here designated by the numeral 19, is generally formed in two halves which can be easily assembled about a rotating member. The sealing strip supporting member 19 is shown as having six grooves or recesses 20 into three of which there are mounted seal forming strips 21 that are secured in place by deformable caulking strips 22 in the manner described above.

In the practice of my invention the seal forming strips or fins 14, 17 and/or 21 are first cut and shaped to fit the particular circumference of the grooves into which they are to be mounted. Next, the caulking strips 13, 15 and/or 22 are cut and shaped to conform to the size and curvature of the seal forming strips and the groove or recess with which they are to be used, and then, these two members or strips are welded or otherwise permanently secured together. After this operation the seal forming strips, with the caulking strips attached, may be handled as a unit during the mounting of the seal forming strips upon a supporting member. By this procedure the handling of parts is reduced and, as a more important advantage, the formerly difficult and tedious operation of keeping the caulking strips and the fins or seal forming strips in proper relation with each other during the caulking operation is completely eliminated.

Figure 4 of the drawing shows a preferred example of a seal forming strip and a caulking strip assembled together as a unit for mounting about the inner circumference of a stationary supporting member. In this illustration the caulking strip 22 is shown as secured to the seal forming strip or fin 21 by spot welding at spaced points 23.

Up to this point I have illustrated and described my invention as employing a welding as the preferred means for securing the sealing strip and the caulking strip together, but in Figures 5 and 6 of the drawing I show two other arrangements that may be considered as contemplated by my invention.

As shown in Figure 5 of the drawing, one of these arrangements contemplates an upsetting of the sealing strip 21 at spaced points near its secured edge with a punch, as at the points 24, an amount sufficient to effect a tacking of the sealing strip 21 to the caulking strip 22. In this manner, in addition to operating to tack the parts 21 and 22 together, there will be provided raised portions upon the surface of the sealing strip 21 which will present a shear resisting projection upon the sealing strip 21 that will prevent any relative movement between these parts after the caulking strip has been finally caulked into a supporting recess 20.

The arrangement shown in Figure 6 contemplates a reverse of the above operation in that the caulking strip 22 is subjected to a punching force which will extend portions 25 thereof through a series of spaced apertures 26 formed near the secured edge of the sealing strip 21. In this latter arrangement I may also peen over the portions 25 so as to more securely tack the parts 21 and 22 together.

It will be noted that in these latter figures of the drawing the tapering of the sealing strips 21 is located on the side of the sealing strip 21 opposite to that upon which the tapering is shown in Figure 4 of the drawing.

While I have, for the sake of clearness and in order to disclose the invention so that the same can be readily understood, described and illustrated specific devices and arrangements, I desire to have it understood that the invention is not limited to the specific means disclosed, but may be embodied in other ways that will suggest themselves to persons skilled in the art. It is believed that this invention is new and it is desired to claim it so that all such changes as come within the scope of the appended claim are to be considered as part of this invention.

Having thus described my invention, what I claim and desire to secure by Letters Patent is:

In labyrinth packing wherein sealing strips are fastened in circumferentially-extending grooves of a carrying member, said packing comprising a plurality of circumferential assemblies fastened in holding member grooves and each assembly including segments disposed circumferentially in end-to-end relation, each segment having its outer radius suitable to bottom in its holding member groove and including a sealing strip component formed from suitable alloy steel sheet material and a soft iron caulking component fastened to one side of the strip component, said strip and caulking components being pre-shaped arcuately so that the peripheries thereof aline when they are fastened together to form a segment.

GEORGE F. GAYER.

REFERENCES CITED

The following references are of record in the file of this patent:

UNITED STATES PATENTS

| Number | Name | Date |
| --- | --- | --- |
| 898,257 | Parsons et al. | Sept. 8, 1908 |
| 940,778 | Barton | Nov. 23, 1909 |
| 1,419,927 | Hodgkinson | June 20, 1922 |
| 1,708,044 | Baumann | Apr. 9, 1929 |
| 2,020,986 | Anoschenko | Nov. 12, 1935 |

FOREIGN PATENTS

| Number | Country | Date |
| --- | --- | --- |
| 466,405 | Great Britain | 1937 |
| 601,089 | Germany | 1934 |